US010021163B2

(12) United States Patent
Koster et al.

(10) Patent No.: US 10,021,163 B2
(45) Date of Patent: *Jul. 10, 2018

(54) RECONFIGURING A STREAMING APPLICATION TO REDUCE LATENCY MISMATCHES

(71) Applicant: International Business Machines Corporation, Armonk, NY (US)

(72) Inventors: David M. Koster, Rochester, MN (US); Manuel Orozco, Rochester, MN (US); Alexander J. Pogue, Rochester, MN (US); Christopher R. Sabotta, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/458,373

(22) Filed: Mar. 14, 2017

(65) Prior Publication Data

US 2018/0109584 A1    Apr. 19, 2018

Related U.S. Application Data

(63) Continuation of application No. 15/294,446, filed on Oct. 14, 2016, now Pat. No. 9,661,052.

(51) Int. Cl.
*G06F 15/173* (2006.01)
*H04L 29/06* (2006.01)
(Continued)

(52) U.S. Cl.
CPC ........ *H04L 65/607* (2013.01); *H04L 41/5009* (2013.01); *H04L 67/10* (2013.01)

(58) Field of Classification Search
CPC .... H04L 65/607; H04L 67/10; H04L 41/5009
(Continued)

(56) References Cited

U.S. PATENT DOCUMENTS 6,377,575 B1 * 4/2002 Mullaney .............. H04J 3/0685
370/360
7,010,607 B1    3/2006 Bunton
(Continued)

FOREIGN PATENT DOCUMENTS

| CN | 103412794 | 11/2013 |
|---|---|---|
| EP | 2854436 | 4/2015 |

OTHER PUBLICATIONS

Disclosed anonymously, "Dynamic Control over Operator Interconnection and Data Routing in Stream Computing Applications", IPCOM000238360D, Aug. 20, 2014.
(Continued)

*Primary Examiner* — Michael Y Won
(74) *Attorney, Agent, or Firm* — Martin & Associates, LLC; Derek P. Martin (57) ABSTRACT

A latency reconfiguration mechanism in a streams manager detects latency mismatches in a streaming application that affect the performance of the streaming application, and reconfigures the streaming application to minimize the latency mismatches. The reconfiguration can include fusing adjacent processing elements into a single processing element, co-locating adjacent processing elements on the same machine, moving processing elements and/or network links, adding parallel processing elements, and rearranging processing elements and/or network links to create more consistent latency paths. By minimizing latency mismatches and providing more consistent latency paths, the performance of a streaming application is increased by not having to perform significant reordering of data tuples.

20 Claims, 6 Drawing Sheets

(51) Int. Cl.
*H04L 12/24* (2006.01)
*H04L 29/08* (2006.01)

(58) Field of Classification Search
USPC .............................. 709/203, 228, 230, 231
See application file for complete search history.

(56) References Cited

U.S. PATENT DOCUMENTS

| | | | |
|---|---|---|---|
| 7,743,285 B1 | 6/2010 | Aggarwal et al. | |
| 8,560,526 B2 | 10/2013 | Santosuosso et al. | |
| 9,262,222 B2 | 2/2016 | Branson et al. | |
| 9,661,052 B1* | 5/2017 | Koster | H04L 65/607 |
| 2005/0132323 A1* | 6/2005 | Huerta | G06F 8/20 |
| | | | 717/100 |
| 2008/0080568 A1 | 4/2008 | Hughes et al. | |
| 2008/0279204 A1* | 11/2008 | Pratt, Jr. | G01D 21/00 |
| | | | 370/406 |
| 2009/0048776 A1* | 2/2009 | Bouillet | G01C 21/3446 |
| | | | 701/414 |
| 2009/0137211 A1 | 5/2009 | Stengel et al. | |
| 2010/0174770 A1 | 7/2010 | Pandya | |
| 2011/0153630 A1* | 6/2011 | Vernon | G06F 17/30938 |
| | | | 707/758 |
| 2012/0020392 A1 | 1/2012 | O'Keeffe et al. | |
| 2012/0163180 A1* | 6/2012 | Goel | H04L 45/30 |
| | | | 370/238 |
| 2012/0216019 A1* | 8/2012 | Bower | G06F 9/30079 |
| | | | 712/201 |
| 2012/0278793 A1* | 11/2012 | Jalan | G06F 11/3419 |
| | | | 717/158 |
| 2014/0181144 A1 | 6/2014 | Kashiyama | |
| 2015/0256587 A1* | 9/2015 | Walker | H04L 67/142 |
| | | | 709/203 |
| 2017/0193551 A1* | 7/2017 | Santi | G06Q 30/0256 |

OTHER PUBLICATIONS

Xing et al., "Dynamic Load Distribution in the Borealis Stream Processor", in Data Engineering, ICDE 2005. Proceedings 21st International Conference, pp. 791-802, 2005.
Li et al., "Out-of-Order Processing: A New Architecture for High-Performance Stream Systems", Proceedings of the VLDB Endowment, 1(1), pp. 274-288, 2008.
English Abstract for CN103412974, Nov. 27, 2013.
Koster et al., "Reconfiguring a Streaming Application to Reduce Latency Mismatches" U.S. Appl. No. 15/458,373, filed Mar. 14, 2017.
Appendix P—List of IBM Patents or Patent Applications Treated as Related, dated Apr. 17, 2017.

* cited by examiner

RECONFIGURING A STREAMING APPLICATION TO REDUCE LATENCY MISMATCHES

BACKGROUND

1. Technical Field

This disclosure generally relates to streaming applications, and more specifically relates to reconfiguring a streaming application to reduce latency mismatches.

2. Background Art

Streaming applications are known in the art, and typically include multiple processing elements coupled together in a flow graph that process streaming data in near real-time. A processing element typically takes in streaming data in the form of data tuples, operates on the data tuples in some fashion, and outputs the processed data tuples to the next processing element. Streaming applications are becoming more common due to the high performance that can be achieved from near real-time processing of streaming data.

The configuration of a streaming application can be dynamically changed based on the performance of the streaming application. For example, if a processing element is having trouble processing data tuples at a fast enough rate, a similar processing element can be created and placed in parallel, thereby increasing the throughput in a region of the streaming application that was having trouble. Dynamic reconfigurations of a streaming application can lead to latency issues that degrade the performance of the streaming application.

BRIEF SUMMARY

A latency reconfiguration mechanism in a streams manager detects latency mismatches in a streaming application that affect the performance of the streaming application, and reconfigures the streaming application to minimize the latency mismatches. The reconfiguration can include fusing adjacent processing elements into a single processing element, co-locating adjacent processing elements on the same machine, moving processing elements and/or network links, adding parallel processing elements, and rearranging processing elements and/or network links to create more consistent latency paths. By minimizing latency mismatches and providing more consistent latency paths, the performance of a streaming application is increased by not having to perform significant reordering of data tuples.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein are directed to a latency reconfiguration mechanism in a streams manager that detects latency mismatches in a streaming application that affect the performance of the streaming application, and reconfigures the streaming application to minimize the latency mismatches. The reconfiguration can include fusing adjacent processing elements into a single processing element, co-locating adjacent processing elements on the same machine, moving processing elements and/or network links, adding parallel processing elements, and rearranging processing elements and/or network links to create more consistent latency paths. By minimizing latency mismatches and providing more consistent latency paths, the performance of a streaming application is increased by not having to perform significant reordering of data tuples.

Figure 1:
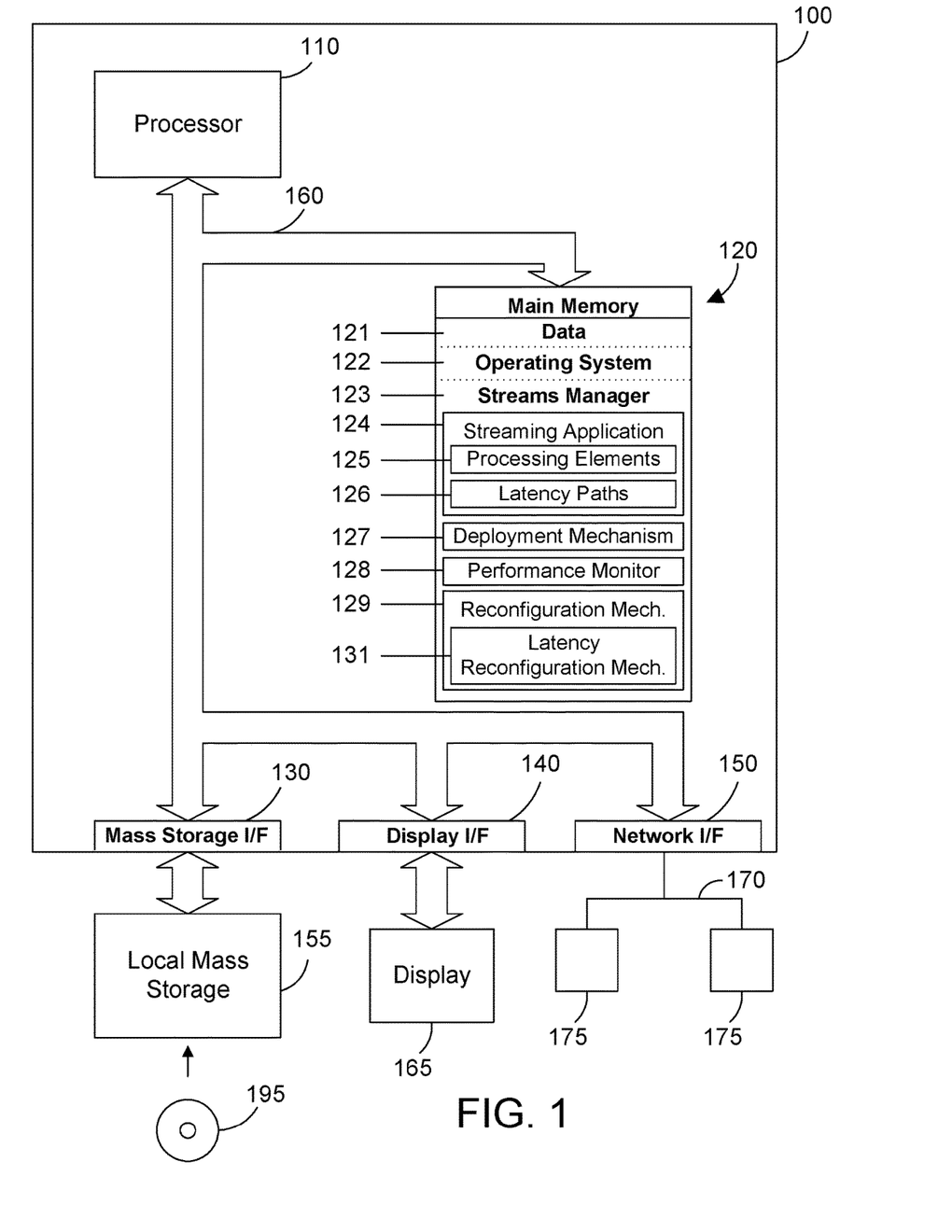
FIG. 1 is a block diagram of a computer system that includes a latency reconfiguration mechanism in a streams manager that can reconfigure a streaming application to provide more consistent latency.

Referring to FIG. 1, a computer system 100 is one suitable implementation of a server computer system that includes a latency reconfiguration mechanism in a streams manager as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is a thumb drive.

Main memory 120 preferably contains data 121, an operating system 122, and a streams manager 123. Data 121 represents any data that serves as input to or output from any program in computer system 100. Operating system 122 is a multitasking operating system, such as AIX or LINUX. The streams manager 123 is software that provides a run-time environment that executes a streaming application 124. The streaming application 124 preferably comprises a flow graph that includes processing elements 125 that include operators that process data tuples. The streaming application 124 preferably defines multiple latency paths 126. As used herein, the term "latency paths" refers to two parallel paths that provide data tuples from a first processing element to a second processing element downstream from the first processing element, regardless of the number and type of processing elements that intervene on one or both paths.

The streams manager 123 includes a deployment mechanism 127 that initially deploys the streaming application 124 to one or more computer systems and one or more network links. The deployment mechanism 127 may make initial assignments of processing elements and network links based on some prediction that indicates a configuration that is believed to provide the required performance. The streams manager 123 further includes a performance monitor 128 that monitors the performance of the streaming application 124 as it runs. The streams manager 123 additionally includes a reconfiguration mechanism 129 that allows reconfiguring the streaming application 124 based on data from performance monitor 128 to dynamically optimize performance of the streaming application 124. The reconfiguration mechanism 129 includes a latency reconfiguration mechanism 131 that preferably performs reconfiguration of the streaming application, including one or more processing elements and/or one or more network links, to reduce mismatches in latency, as discussed in more detail below. While reconfiguring a streaming application to boost its performance is known, such as providing parallel processing elements where bottlenecks occur, the prior art does not teach or suggest reconfiguration of a streaming application to improve latency mismatches between multiple paths in a streaming application.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and streams manager 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the streams manager 123, which executes the streaming application 124, which includes the latency reconfiguration mechanism 131.

Although computer system 100 is shown to contain only a single processor and a single system bus, those skilled in the art will appreciate that a latency reconfiguration mechanism as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175 represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
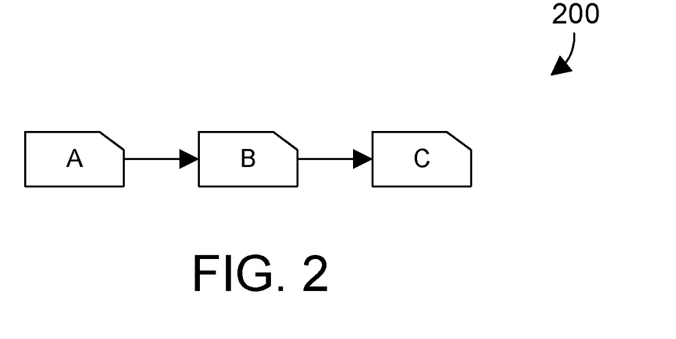
FIG. 2 is a sample flow graph of a simple streaming application showing three processing elements that process data tuples.
Figure 3:
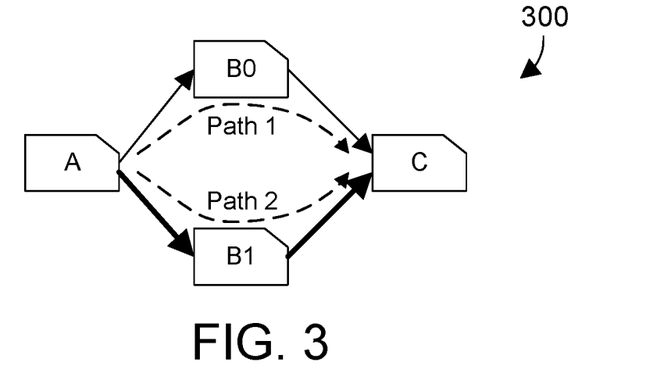
FIG. 3 shows the sample flow graph in FIG. 2 after a second B processing element is added to process data tuples received from processing element A, and illustrating a latency mismatch in the two paths.

FIG. 2 shows a very simple streaming application 200 for the purpose of illustrating the concepts herein. Streaming application 200 includes a processing element A that is the source of data tuples, and which sends its data tuples to processing element B, which in turn operates on the data tuples in some fashion, and outputs its data tuples to processing element C, which is a sink for the data tuples. Let's assume the deployment mechanism 127 determines to deploy each of the processing elements A, B and C to different virtual machines. Now we assume for this example that processing element B begins to experience backpressure, meaning it processes and outputs data tuples at a slower rate than it receives data tuples. We assume for this simple example the performance monitor 128 detects the backpressure in processing element B, and as a result, the reconfiguration mechanism 129 decides to make one or more changes to the streaming application 200 to enhance its performance. One such change would be to clone processing element B, providing two processing elements that do the work of operator B shown in FIG. 2, as shown in the reconfigured streaming application 300 shown in FIG. 3 that includes parallel processing elements B1 and B1. While the cloning of processing element B as shown in FIG. 3 can increase performance of the streaming application, there are other issues that can arise because there are now two different paths from processing element A to processing element C, as shown as Path 1 and Path 2 in FIG. 3. If all the processing elements A, B1, B1 and C were implemented on the same computer system, having the two parallel paths would not pose much of a problem, because the processing time in B1 would be very similar to the processing time in B1, the time for tuples to travel from A to B1 would be very similar to the time for tuples to travel from A to B1, and the time for tuples to travel from B1 to C would be very similar to the time for tuples to travel from B1 to C. However, many streaming applications include hundreds or thousands of processing elements that can be deployed over a wide array of different computer systems and network links, including dedicated computer systems, virtual machines in a cloud computer system, dedicated network links, and virtual network links. As a result, when a streaming application has parallel paths as shown in FIG. 3, there can be a latency mismatch between the two paths. For example, let's assume that path 2 in FIG. 3, which includes network links represented by the bold arrows, experiences much more delay than path 1. Since A splits its output tuple flow between B1 and B1, tuples that experience more network issues enroute to B1 will be delayed behind tuples moving through B1. If the latency were constant, processing element A could adjust by moving more of the tuple flow to B1. But when the latency is variable, the streaming application will spend a significant amount of time rebuilding the order correctly before sending data tuples to operator C. This reordering of tuples due to the mismatch in latency between Path 1 and Path 2 in FIG. 3 can significantly impact run-time performance of the streaming application.

There are three different kinds of latency that could occur in the streaming application 300 in FIG. 3. Processing-based latency is latency caused within a processing element. Thus, the detected backpressure in processing element B in FIG. 2 discussed above is an example of processing-based latency. Network latency is the latency that results from data tuples flowing through network links between processing elements, such as between processing elements A and B1 in FIG. 3. Network latency can be thought of as latency in the edges of the flow graph between processing elements. Reorder latency is latency caused by having to reorder data tuples that arrive in the wrong order on parallel data paths, as discussed above with reference to FIG. 3. For example, let's assume processing element A in FIG. 3 sends data tuples TP1 to B1, TP2 to B1, TP3 to B1, and TP4 to B1. We assume that due to the latency mismatch between Path 1 and Path 2 in FIG. 3, that B1 delivers TP1 to C, followed by B1 delivering TP3 to C, followed by B1 delivering TP2 to C, followed by B1 delivering TP4 to C. Note that TP3 arrives at C before TP2, so the streams manager must reorder the tuples so processing element C receives the data tuples in the correct order. Such reordering can significantly degrade performance of the streaming application. Note the mismatch in latency between Path 1 and Path 2 in FIG. 3 could be caused by processing-based latency in B1, network-based latency in the network links connecting A to B1 and B1 to C, or both.

Figure 4:
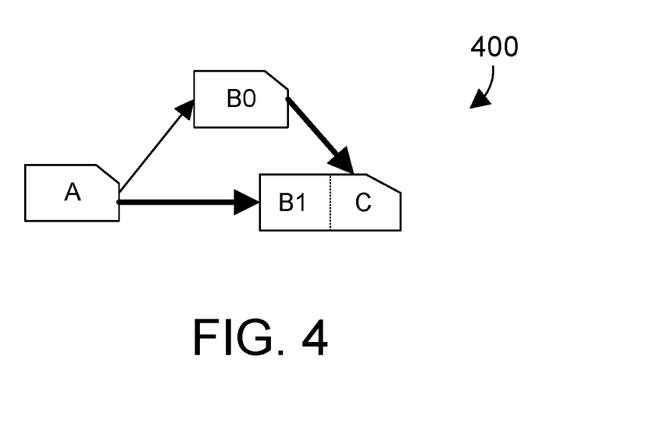
FIG. 4 shows one suitable way of reorganizing the flow graph in FIG. 3 to reduce the latency mismatch.

Once the performance monitor detects the two parallel paths Path 1 and Path 2 in FIG. 3 have a mismatch in latencies, the latency reconfiguration mechanism 131 in FIG. 1 can reconfigure the streaming application to reduce the mismatch in latencies. FIG. 4 shows one suitable example of a reconfigured streaming application 400 where processing elements B1 and C have been fused into a single processing element, thereby eliminating the network link between B1 and C. Assuming the network links in the bold arrows in FIG. 3 are the primary cause of the latency mismatch between Path 1 and Path 2, fusing B1 and C as shown in FIG. 4 eliminates one of these network links, which therefore reduces the latency mismatch, thereby improving performance of the streaming application.

Figure 5:
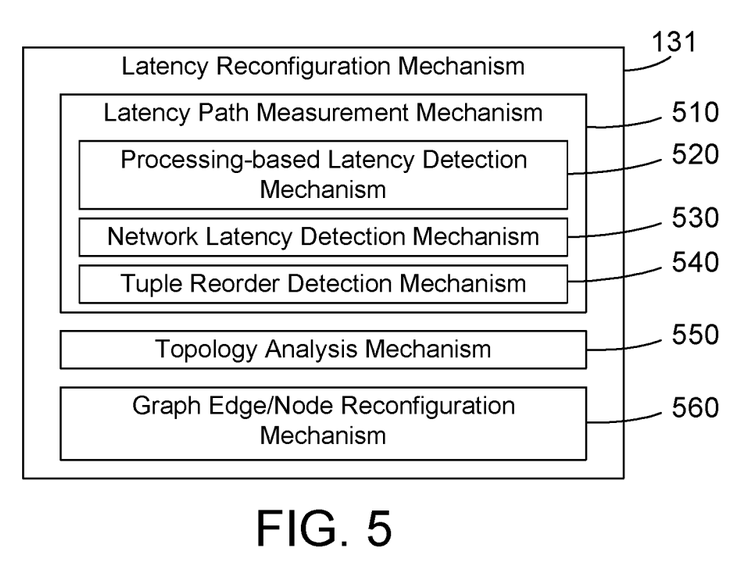
FIG. 5 is a block diagram showing possible details of the latency reconfiguration mechanism 131 shown in FIG. 1.

FIG. 5 shows the latency reconfiguration mechanism 131 in FIG. 1 with some possible details according to one specific implementation. The latency reconfiguration mechanism 131 preferably includes a latency path measurement mechanism 510. The latency path measurement mechanism 510 can includes a processing-based latency detection mechanism 520, a network latency detection mechanism 530, and a tuple reorder detection mechanism 540, which each detect one of the three types of latency described above. The latency reconfiguration mechanism 131 also includes a topology analysis mechanism 550 that analyzes the topology of the streaming application to determine possible reconfigurations to reduce latency mismatches in the streaming application. The latency reconfiguration mechanism 131 further includes a graph edge/node reconfiguration mechanism 560, which can reconfigure graph edges that correspond to network links, or graph nodes that correspond to processing elements, to reduce one or more latency mismatches in the streaming application. Examples are discussed below for illustrating the function of the graph edge/node reconfiguration mechanism 560.

The latency reconfiguration mechanism 131 can perform its functions in any suitable way. For example, a developer could annotate operators for which they want to guarantee ordering of tuples at the input, which could cause the latency reconfiguration mechanism 131 to reduce latency mismatch for such operators. In another example, during compilation of the streaming application the compiler could identify operators for which to guarantee ordering at the input, which could cause the latency reconfiguration mechanism 131 to reduce latency mismatch for such operators. In yet another example, the latency reconfiguration mechanism 131 could function by analyzing the processing elements and latencies real-time and dynamically determining where to reduce latency mismatch in the flow graph. These and other variations are within the scope of the disclosure and claims herein.

Figure 6:
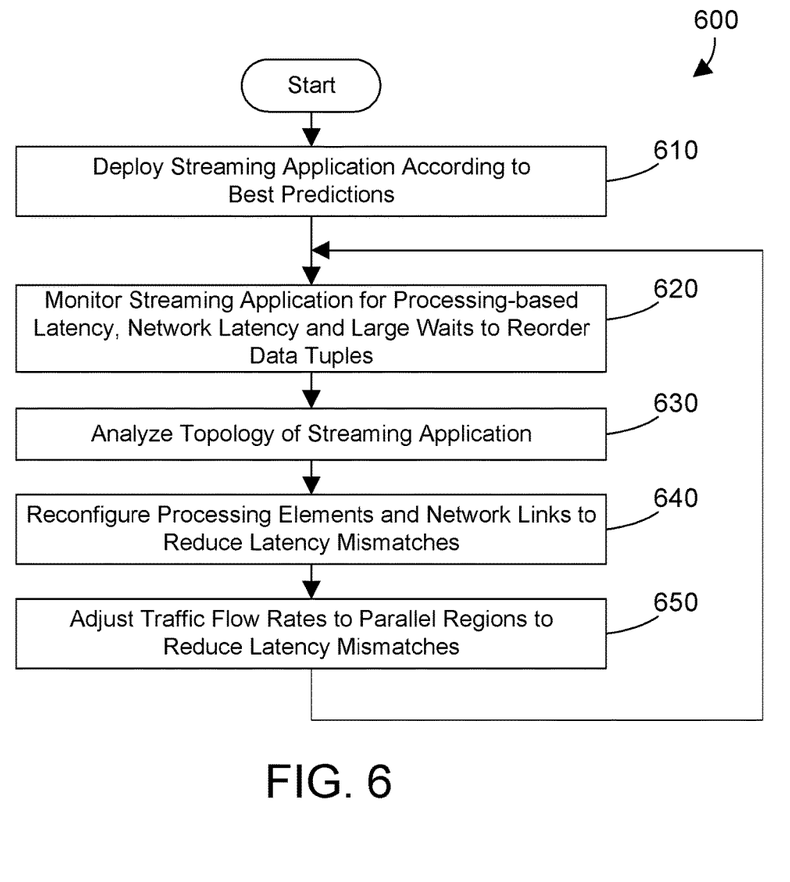
FIG. 6 is a flow diagram of a method for reconfiguring a streaming application to minimize one or more mismatches in latencies.

Referring to FIG. 6, a method 600 for running streaming applications begins by deploying the streaming application according to best predictions (step 610). This involves making educated choices regarding number of computer systems, network links, distribution of processing elements and network links, etc. Step 610 could be performed by prior art methods of initially deploying a streaming application. Once the streaming application is deployed in step 610, it is executed. While the streaming application executes, the streaming application is monitored for processing-based latency, network latency and large waits to reorder data tuples (step 620). The topology of the streaming application is analyzed (step 630). One or more processing elements and/or one or more network links are reconfigured to reduce one or more latency mismatches (step 640). Traffic flow rates to parallel regions can also be adjusted to reduce one or more latency mismatches (step 650). Method 600 then loops back to step 620 and continues, which means method 600 continues to dynamically monitor, analyze and reconfigure as needed to reduce latency mismatches in a streaming application. In the most preferred implementation, the analysis and reconfiguration continues with the goal of minimizing latency mismatches.

There are a number of different reconfiguration operations that could be performed within the scope of the disclosure and claims herein to reduce latency mismatches. Examples of suitable reconfiguration operations are shown in table 700 in FIG. 7. Note these reconfiguration operations in table 700 are shown by way of example, and are not limiting. Two or more adjacent processing elements could be fused into a single processing element, thereby eliminating one or more network links, as shown at 710, which reduces network latency. Two or more adjacent processing elements can be co-located on the same machine, which eliminates one or more network links, as shown at 720, which reduces network latency. One or more processing elements can be moved to a different machine, as shown at 730, which could reduce processing-based latency. One or more network links can be moved to faster hardware, as shown at 740, which reduces network latency. One or more parallel processing elements can be added, as shown at 750, which reduces processing-based latency. The flow graph can be reconfigured to create more consistent latency paths, as shown at 760. Examples below illustrate each of these reconfiguration operations shown in table 700 in FIG. 7.

In a streaming application, the streams manager can mark parallel regions so that identical processing elements can be identified. This allows performing a unique latency analysis. Since the code being executed is identical, this means any performance difference between B1 and B1 can be identified as either network latency, which is measurable by congestion or pings, or processing latency, such as less CPU power or other programs are also executing. In the case of processing latency, we recognize that if B1 is slower than B1, reducing the traffic flow to B1 will not result in a latency equilibrium. One of the ways to reduce the latency from the perspective of A to C is to cut out one or both of the networks links in Path 2. We can measure the additional latency brought in by the network link(s) and determine if that is adequate. If removing one or more of the network links would be adequate, processing elements B1 and C could be fused into a single processing element, as shown in FIG. 4, which is an example of 710 in FIG. 7. In the alternative, B1 could be placed on the same machine as A or C, which is an example of 720 in FIG. 7. If B1 and C are co-located, each path has one slow link. The path from A to B1 is slow, and the path from B1 to C is equally slow, as shown by the bold arrows in FIG. 4. This results in a uniform latency for the two paths from A to C. Uniform latency between two parallel paths is often more important than minimum latency, because uniform latency reduces or eliminates reordering of tuples that must otherwise occur with latency mismatches between two or more parallel paths. So uniform latency is often a more desirable goal than minimum latency. Uniform latency between parallel paths results in improved performance, even when the uniform latency is not the minimum latency.

Figure 7:
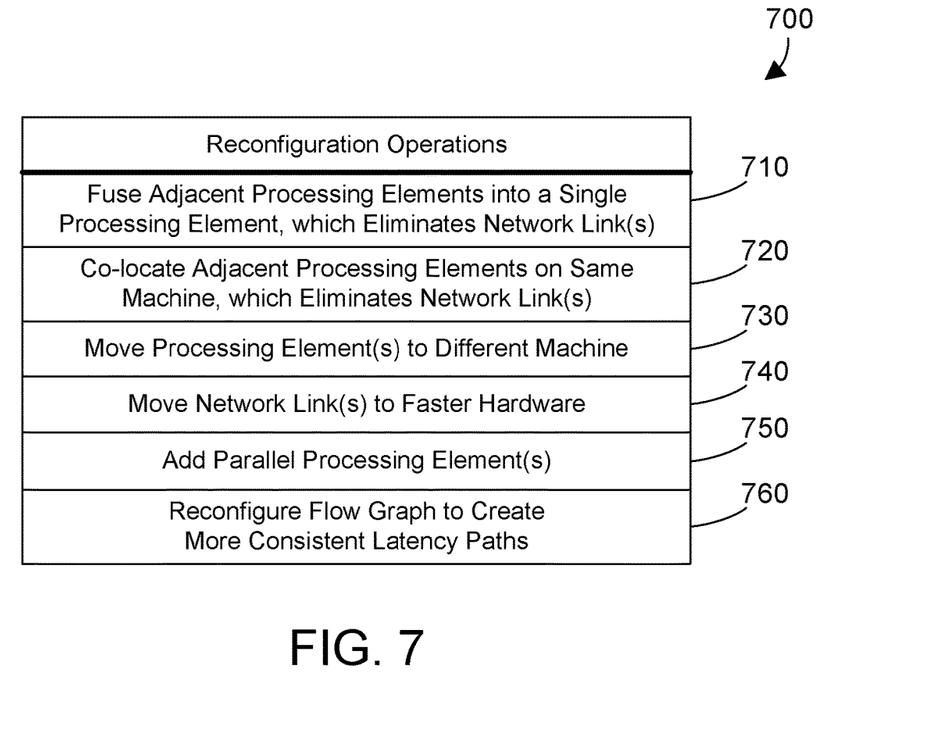
FIG. 7 is a table that shows possible redistribution operations that could be performed by the latency reconfiguration mechanism 131 in FIGS. 1 and 5.

If the network links aren't enough to compensate for the latency induced by the slower hardware we can also consider relocating B1 to a different machine, such as a machine with faster hardware or a machine in a closer data center, which is an example of 730 in FIG. 7. The different machine could be a dedicated machine or a virtual machine.

For the next example, we assume B1 and B1 are on identical hardware and running equally fast. However, for an unknown reason Path 2 is slower. For example, B1 may be behind faulty network equipment, or in another data center that takes longer to reach. Regardless of reason, B1 takes longer to get tuples to and from, but the rate of processing in tuples per second is still the same as B1. B1 could be moved to faster hardware, which is an example of 730 in FIG. 7. This is easier than the previous scenario, because we can vet the candidate machines before ever moving B1. By simply relaying test network traffic we can look at the latency of the network link and determine if it is closer or farther than B1 is currently. If it's closer, we reduce network latency by moving B1 to the different machine, which is an example of 730 in FIG. 7.

In another example, the network latency in Path 2 in FIG. 3 could be improved by moving one or both network links between A and B1 and between B1 and C to faster hardware, which is an example of 740 in FIG. 7. In another example, we assume B1 and B1 are on identical hardware, and take equal time to reach. B1 is having performance issues. The performance monitor determines there is congestion around B1. For some reason, B1 has less network capacity. This could be caused, for example, by older network hardware, other programs using the network link, or other factors. This problem can be addressed by shifting network traffic from B1 to B1 until B1 has reached one of the other saturation conditions discussed herein.

Figure 8:
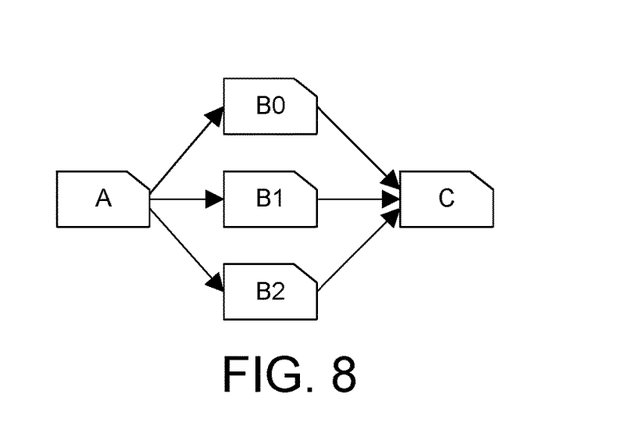
FIG. 8 shows the sample flow graph in FIG. 3 after a third B processing element is added to process data tuples received from processing element A.

If the problem persists after offloading all possible traffic to the faster machine(s), the latency reconfiguration mechanism could investigate using any of 710, 720, or 750 to reduce one or more latency mismatches. Additional parallelization in step 750 is a new technique for addressing latency mismatches. In the prior art, the streaming application is deployed according to best predictions, as shown in step 610 in FIG. 6. In this example in FIG. 3, we assume the streaming application has been deployed according to the best possible placement scenario, where no metric indicates saturation, but the performance monitors still indicates there is a mismatch in latency between the two paths. Thus this is a problem of processing elements not keeping up with data flow. This can be addressed by creating more processing elements to operate in parallel. For example, the flow graph in FIG. 3 could be reconfigured as shown in FIG. 8 to add an additional processing element B2 to process tuples from processing element A in parallel with processing elements B1 and B2, which is an example of 750 in FIG. 7.

Figure 9:
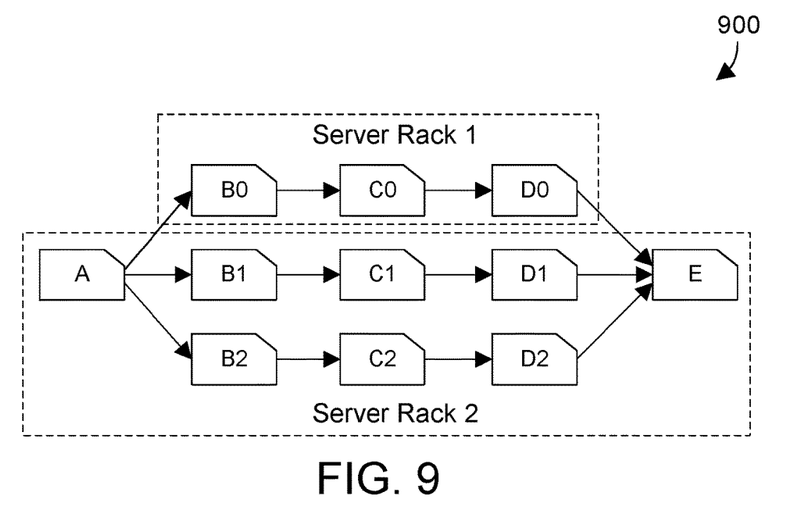
FIG. 9 is a flow diagram showing deployment of processing elements on two different server racks.
Figure 10:
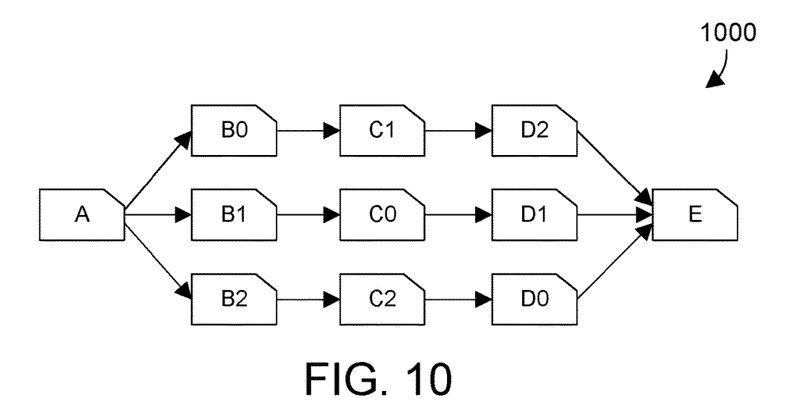
FIG. 10 is a flow diagram of the streaming application shown in FIG. 9 but reconfigured to produce more consistent latencies in the three paths, thereby reducing latency mismatches.

Now we consider a more complex example that illustrates 760 in FIG. 7. We assume the processing elements in FIG. 9 are deployed to servers in two different server racks, as shown. We assume the streaming application has been scaled up to provide three parallel paths that all perform the same processing on data tuples from processing element A and that deliver their data tuples to processing element E. We assume for this example in FIG. 9 everything is on more or less identical hardware, and there is generally fairly similar network latency between all pieces. For simplicity of discussion, let's say that everything in the B1-C0-D0 path has an additional 5 ms per processing element compared to the B1-C1-D1 and B2-C2-D2 paths. This could be caused, for example, by the B1-C0-D0 path being placed on a server rack (Server Rack 1) that's just a little farther away from Server Rack 2 where everything else resides. While 5 ms is not a large skew of itself, but when the 5 ms is compounded over three hops, the total of 15 ms in latency mismatch can cause problems for some streaming applications. If none of the reconfiguration operations 710, 720, 730, 740 or 750 in FIG. 7 provide acceptable results, the flow graph can be reconfigured to create more consistent latency paths, which is an example of 760 in FIG. 7. One possible reconfiguration of the streaming application 900 in FIG. 9 is shown by the reconfigured streaming application 1000 in FIG. 10. Note the placement of the processing elements on the two racks remains the same as shown in FIG. 9, but the network links are reconfigured to connect different processing elements to each other. With the reconfigured application 1000 in FIG. 10, every processing element has to conduct two hops to/from Rack 2. Since we assume optimal placement to begin with, no reconfiguration of hardware would have helped the problem. If the servers are tuned and fully loaded, fusing processing elements in 710 is not an option. So in order to save from having to reorder tuples arriving at E from the three parallel paths, the flow graph is reconfigured so the data tuples from all three parallel paths arrive at the same time. This example assumes that reducing latency mismatches is desirable even when the overall latency in one of the paths increases, because many streaming applications perform better when latency mismatches are reduced, even when the reduction results in less than minimum latency in any of the parallel paths.

The examples provided herein are extremely simplified to illustrate the general concepts of reconfiguring a streaming application to reduce latency mismatches based on conditions in the streaming application. Most streaming applications are significantly more complex than shown in the examples herein. However, one skilled in the art will appreciate the concepts disclosed and claimed herein can extend to a streaming application of any suitable level of complexity.

A latency reconfiguration mechanism in a streams manager detects latency mismatches in a streaming application that affect the performance of the streaming application, and reconfigures the streaming application to minimize the latency mismatches. The reconfiguration can include fusing adjacent processing elements into a single processing element, co-locating adjacent processing elements on the same machine, moving processing elements and/or network links, adding parallel processing elements, and rearranging processing elements and/or network links to create more consistent latency paths. By minimizing latency mismatches and providing more consistent latency paths, the performance of a streaming application is increased by not having to perform significant reordering of data tuples.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a streaming application residing in the memory and executed by the at least one processor, the streaming application comprising a plurality of latency paths, where a first processing element in the streaming application receives data tuples from a plurality of processing elements in the streaming application that comprise the plurality of latency paths;
   a latency reconfiguration mechanism residing in the memory and executed by the at least one processor, wherein the latency reconfiguration mechanism monitors latency in the plurality of latency paths in the streaming application as the streaming application executes, and when there is a mismatch as the streaming application executes between a first of the plurality of latency paths that provides data tuples to the first processing element and a second of the plurality of latency paths that provides data tuples to the first processing element, the latency reconfiguration mechanism reconfigures as the streaming application executes at least one of the plurality of processing elements to reduce the mismatch between the first and second latency paths.

2. The apparatus of claim 1 wherein the latency reconfiguration mechanism further reconfigures at least one network link in the streaming application to reduce the mismatch between the first and second latency paths.

3. The apparatus of claim 2 wherein the reconfiguration of the at least one network link comprises moving the at least one network link to faster hardware.

4. The apparatus of claim 3 wherein the reconfiguration comprises reconfiguring the plurality of processing elements and reconfiguring the at least one network link to reduce the mismatch between the first and second latency paths.

5. The apparatus of claim 1 wherein the reconfiguration of the at least one of the plurality of processing elements comprises fusing adjacent processing elements into a single processing element to eliminate at least one network link.

6. The apparatus of claim 1 wherein the reconfiguration of the at least one of the plurality of processing elements comprises co-locating adjacent processing elements on a same machine to eliminate at least one network link.

7. The apparatus of claim 1 wherein the reconfiguration of the at least one of the plurality of processing elements comprises moving the at least one of the plurality of processing elements to faster hardware.

8. The apparatus of claim 1 wherein the reconfiguration of the at least one of the plurality of processing elements comprises adding at least one parallel processing element to the streaming application.

9. The apparatus of claim 1 wherein reducing the mismatch between the first and second latency paths results in more consistent latency in the first and second latency paths without providing minimum latency in either of the first and second latency paths.

10. The apparatus of claim 1 wherein the latency reconfiguration mechanism reduces the mismatch between the first and second latency paths according to an annotation in the streaming application by a developer that indicates a need to enforce ordering of the data tuples.

11. A computer-implemented method executed by at least one processor for running streaming applications, the method comprising:
    monitoring as a streaming application executes latency in a plurality of latency paths in the streaming application that comprises software executed by the at least one processor, where a first processing element in the streaming application receives data tuples from a plurality of processing elements in the streaming application that comprise the plurality of latency paths; and
    when there is a mismatch as the streaming application executes between a first of the plurality of latency paths that provides data tuples to the first processing element and a second of the plurality of latency paths that provides data tuples to the first processing element, reconfiguring as the streaming application executes at least one of the plurality of processing elements to reduce the mismatch between the first and second latency paths.

12. The method of claim 11 further comprising reconfiguring at least one network link in the streaming application to reduce the mismatch between the first and second latency paths.

13. The method of claim 12 wherein the reconfiguring the at least one network link comprises moving the at least one network link to faster hardware.

14. The method of claim 11 wherein the reconfiguring the at least one of the plurality of processing elements comprises fusing adjacent processing elements into a single processing element to eliminate at least one network link.

15. The method of claim 11 wherein the reconfiguring the at least one of the plurality of processing elements comprises co-locating adjacent processing elements on a same machine to eliminate at least one network link.

16. The method of claim 11 wherein the reconfiguring the at least one of the plurality of processing elements comprises moving the at least one of the plurality of processing elements to faster hardware.

17. The method of claim 11 wherein the reconfiguring the at least one of the plurality of processing elements comprises adding at least one parallel processing element to the streaming application.

18. The method of claim 11 wherein reducing the mismatch between the first and second latency paths results in more consistent latency in the first and second latency paths without providing minimum latency in either of the first and second latency paths.

19. The method of claim 11 wherein reducing the mismatch between the first and second latency paths is performed according to an annotation in the streaming application by a developer that indicates a need to enforce ordering of the data tuples.

20. An article of manufacture comprising software store on a computer readable storage medium, the software comprising:

a latency reconfiguration mechanism that monitors as a streaming application executes latency in a plurality of latency paths in the streaming application that comprises software executed by at least one processor, where a first processing element in the streaming application receives data tuples from a plurality of processing elements in the streaming application that comprise the plurality of latency paths, and when there is a mismatch as the streaming application executes between a first of the plurality of latency paths that provides data tuples to the first processing element and a second of the plurality of latency paths that provides data tuples to the first processing element, the latency reconfiguration mechanism reconfigures as the streaming application executes at least one of the plurality of processing elements to reduce the mismatch between the first and second latency paths.

* * * * *